(12) United States Patent
Bliley et al.

(10) Patent No.: US 7,355,358 B2
(45) Date of Patent: Apr. 8, 2008

(54) CONFIGURABLE H-BRIDGE CIRCUIT

(75) Inventors: Paul D. Bliley, Vancouver, WA (US); William Jennings, Vancouver, WA (US); Glenn M. Smith, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 66 days.

(21) Appl. No.: 10/692,263

(22) Filed: Oct. 23, 2003

(65) Prior Publication Data

US 2005/0088125 A1 Apr. 28, 2005

(51) Int. Cl.
*H02K 21/00* (2006.01)

(52) U.S. Cl. .............. 318/254; 318/685; 318/696; 318/34; 318/590; 318/568.1; 101/365

(58) Field of Classification Search .......... 257/288, 257/341, 787, 401; 318/34–38, 51–57, 66–75, 318/111–113, 138, 434, 439, 293–300, 254; 400/223–225, 234, 154.5, 163, 902–903
See application file for complete search history.

(56) References Cited

U.S. PATENT DOCUMENTS

| | | | | |
|---|---|---|---|---|
| 4,573,410 A | * | 3/1986 | Blasius et al. | 101/365 |
| 5,366,303 A | * | 11/1994 | Barrus et al. | 400/234 |
| 5,378,975 A | * | 1/1995 | Schweid et al. | 318/685 |
| 5,764,006 A | * | 6/1998 | Amanuma et al. | 318/103 |
| 5,847,521 A | * | 12/1998 | Morikawa et al. | 318/254 |
| 5,892,340 A | * | 4/1999 | Sasajima et al. | 318/293 |
| 6,082,914 A | * | 7/2000 | Barrus et al. | 400/234 |
| 6,246,205 B1 | * | 6/2001 | Kujira et al. | 318/685 |
| 6,404,155 B1 | * | 6/2002 | Funayama et al. | 318/293 |
| 6,552,581 B1 | * | 4/2003 | Gabara | 327/108 |
| 6,593,711 B2 | * | 7/2003 | Brereton | 318/34 |
| 6,747,300 B2 | * | 6/2004 | Nadd et al. | 257/288 |
| 6,762,745 B1 | * | 7/2004 | Braun et al. | 345/156 |
| 2002/0159315 A1 | * | 10/2002 | Noguchi et al. | 365/200 |
| 2004/0230861 A1 | * | 11/2004 | Bailey et al. | 714/6 |
| 2004/0232864 A1 | * | 11/2004 | Sunaga et al. | 318/434 |
| 2005/0024000 A1 | * | 2/2005 | Aizawa | 318/34 |

FOREIGN PATENT DOCUMENTS

| | | | |
|---|---|---|---|
| DE | 3335349 A1 | * | 4/1985 |
| DE | 4440064 | | 5/1996 |
| EP | 0369954 | | 9/1944 |
| EP | 0833437 | | 4/1998 |
| JP | 2-184295 | | 11/1989 |
| JP | 200-224895 | | 1/1999 |

OTHER PUBLICATIONS

Translation of EP 0833437, Hella.*
European Search Report dated Feb. 14, 2005.

* cited by examiner

*Primary Examiner*—Lincoln Donovan
*Assistant Examiner*—Renata McCloud

(57) ABSTRACT

In an implementation of a configurable H-bridge circuit, a high switch is connected to a voltage source and a low switch is connected to ground. The configurable H-bridge circuit includes a first configuration as a motor drive circuit in which the high switch and the low switch are connected together and coupled to drive a motor. The configurable H-bridge circuit also includes a second configuration in which the high switch and the low switch are each configured as a discrete switch that can be coupled as a component switch.

35 Claims, 5 Drawing Sheets

CONFIGURABLE H-BRIDGE CIRCUIT

TECHNICAL FIELD

This invention relates to configurable H-bridge circuit(s).

BACKGROUND

Imaging devices, such as printing devices and all-in-one devices that scan, print, and copy, utilize motors to drive paper feed mechanisms, move imaging, scanning, and printing units, and/or enable servicing systems such as printhead wipers, printhead capping devices, and printhead cleaning systems. These are only a few examples of how motors may be utilized within an imaging device. Many such devices are designed such that more than one system function is coupled to the same motor so that fewer motors are needed to support the multiple system functions. Typically, imaging devices have been developed with three motors and with a corresponding application specific integrated circuit (ASIC) configured to control the three motors.

The motor control ASIC is implemented with an H-bridge circuit structure that enables a microprocessor or controller to independently control each motor in an imaging device. The ASIC includes one H-bridge circuit for each motor being controlled, and for a typical three-motor device, the ASIC will include three H-bridge circuits. With the advent of two-motor imaging devices, two H-bridge circuits of the ASIC will be utilized to control the two motors while the third H-bridge circuit goes unutilized.

The motor control ASIC with the three H-bridge circuit structure continues to be implemented in two-motor imaging devices because it would not be cost effective to design a specialized ASIC with only two H-bridge circuit motor drives, particularly when taking into account the large volume purchase discounts for high volume devices. The small savings in component costs, as well as the savings that would otherwise be incurred for additional engineering and design costs to produce a specialized ASIC, are significant with the high volume sales of such devices. It is cost effective and beneficial to design and utilize an ASIC which can be implemented for similar, yet different devices, such as two-motor and three-motor imaging devices. However, it would also be beneficial if the third H-bridge circuit of an ASIC in a two-motor device could be utilized for component and/or system functionality in the device rather than go unutilized as a motor control.

BRIEF DESCRIPTION OF THE DRAWINGS

The same numbers are used throughout the drawings to reference like features and components.

DETAILED DESCRIPTION

The following describes a configurable H-bridge circuit that can be implemented as independent switches or as a motor drive circuit. In an exemplary implementation, an application-specific integrated circuit (ASIC) includes three H-bridge motor drive circuits. The ASIC can be implemented in an imaging device, such as a printer for example, that utilizes only two motors to drive mechanisms and components of the device.

The third H-bridge circuit of the ASIC which is not utilized as a motor drive in a two-motor device can be configured as two high side and two low side discrete switches. The two high side switches are connected to an input voltage and can each be utilized to provide switched power to components in the imaging device. The two low side switches are connected to ground and can each be utilized as pull-down devices to provide excess current, such as for LED operation to scan and copy for example.

It would not be cost effective to design a specialized ASIC with two H-bridge motor drive circuits for newly developed two-motor devices, particularly when large purchase discounts help to keep down manufacturing costs for high volume devices. Utilizing the third H-bridge circuit as discrete switches also provides design flexibility during manufacture of a device and is cost effective in that extra discrete switches do not have to be purchased and added to a device during manufacture.

Figure 1A:
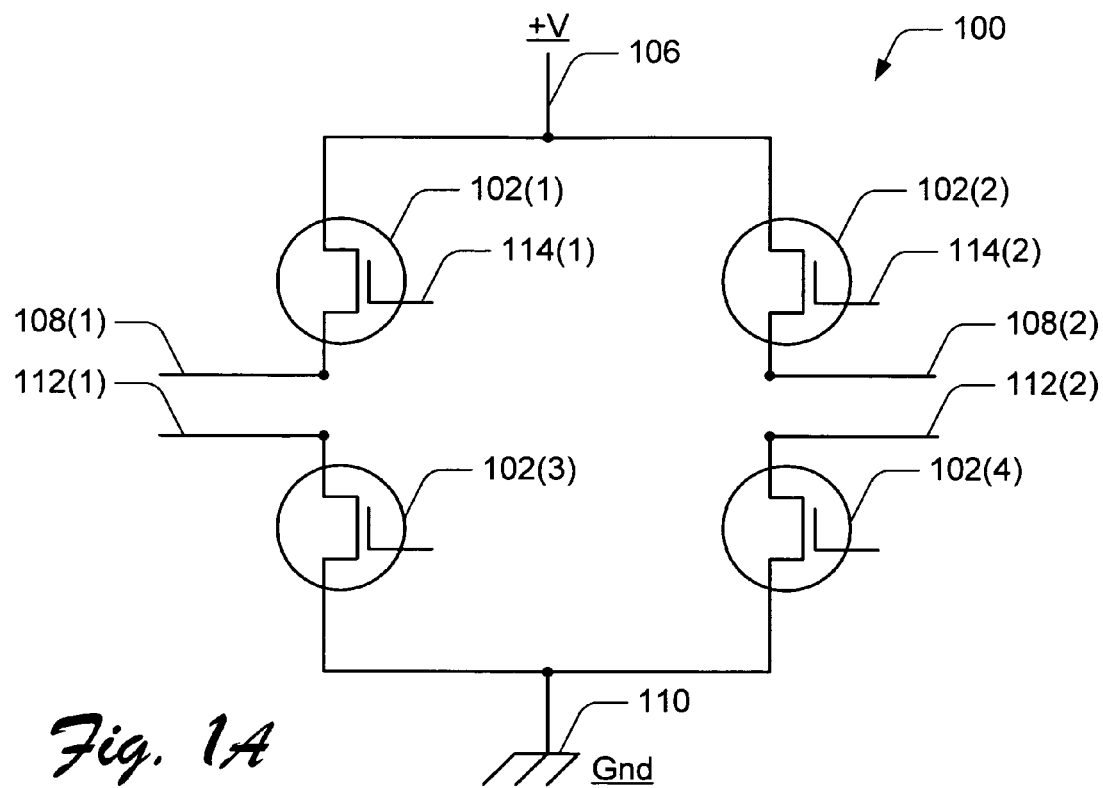
FIGS. 1A and 1B illustrate an exemplary H-bridge circuit that can be configured as discrete switches or as a motor drive circuit.
Figure 1B:
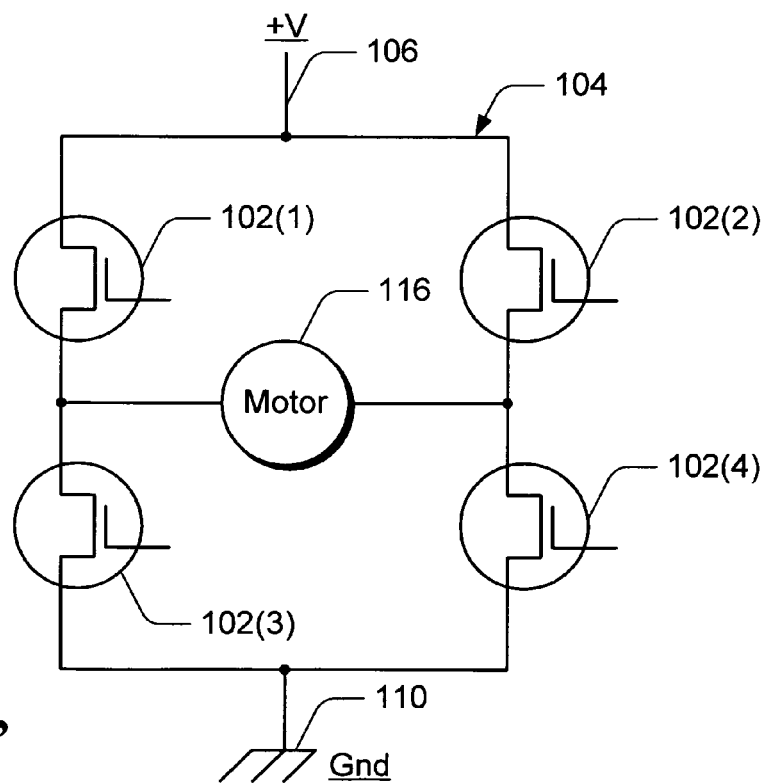

FIGS. 1A and 1B illustrate an exemplary configurable H-bridge circuit 100 that can be configured as discrete switches 102(1) through 102(4) (FIG. 1A), or can be configured as a motor drive circuit 104 (FIG. 1B). When the configurable H-bridge circuit 100 is implemented as discrete switches (FIG. 1A), a first high switch 102(1) and a second high switch 102(2) are each connected to a voltage source 106. The first and second high switches 102(1) and 102(2) each have an output connection 108(1) and 108(2), respectively. Additionally, a first low switch 102(3) and a second low switch 102(4) are each connected to ground 110 and have an output connection 112(1) and 112(2), respectively. Any of the discrete switches 102 can be independently coupled to a device component to provide switched power and/or a connection to ground. An example of an imaging device is described below with reference to the exemplary printing device 500 shown in FIG. 5. Printing device 500 includes examples of components that may be coupled to a discrete switch 102 of the H-bridge circuit 100.

The discrete switches 102 can be implemented as any one or more of field effect transistors (FETs), bipolar transistors, relays, and/or any other type of switching device. A gate drive voltage can be applied to gates 114(1) and 114(2) of the high switches 102(1) and 102(2), respectively. The gate drive voltage enables a particular voltage range on each of the high side switches 102(1) and 102(2) and turns on the high side switches such that they can be implemented as series switches that pass a voltage.

When the configurable H-bridge circuit is implemented as a motor drive circuit 104 (FIG. 1B), an output of the first high switch 102(1) is connected to an input of the first low switch 102(3) and the two switches are coupled to drive a motor 116 in a first direction. Similarly, an output of the second high switch 102(2) is connected to an input of the second low switch 102(4) and the two switches are coupled to drive the motor 116 in an opposite, second direction. Printing device 500 (FIG. 5) also includes examples of components that may be driven by motor 116 when the configurable H-bridge circuit 100 is implemented as a motor drive circuit 104.

Figure 2:
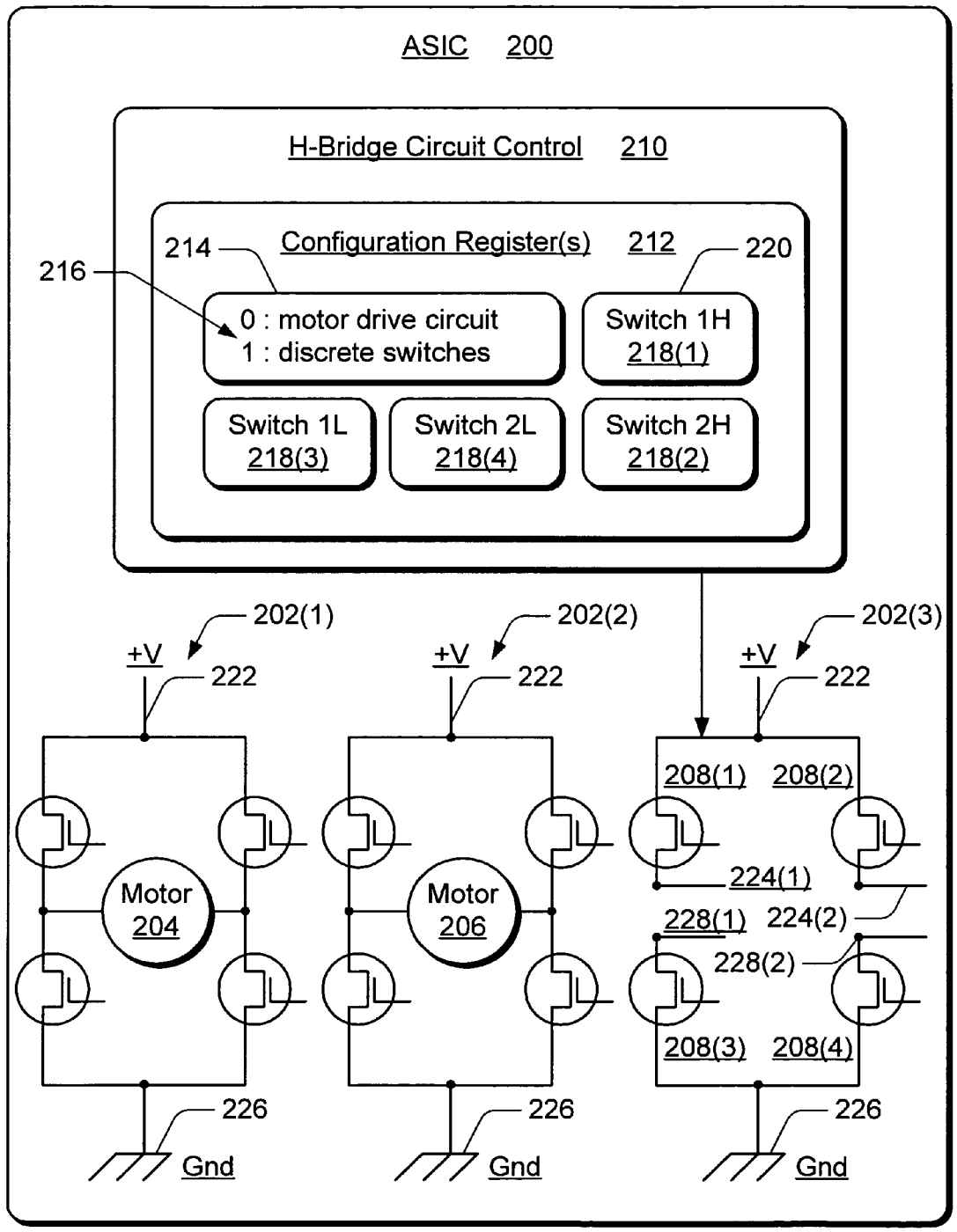
FIG. 2 illustrates an exemplary application-specific integrated circuit (ASIC) in which configurable H-bridge circuits can each be implemented as discrete switches or as a motor drive circuit.

FIG. 2 illustrates an exemplary application-specific integrated circuit (ASIC) 200 in which configurable H-bridge circuits 202(1), 202(2), and 202(3) can each be configured and implemented as discrete switches or as a motor drive circuit. In this example, configurable H-bridge circuits 202(1) and 202(2) are implemented as motor drive circuits to drive motor 204 and motor 206, respectively. The configurable H-bridge circuit 202(3) is configured as discrete switches 208 each of which can be independently coupled to a device component to provide switched power and/or a connection to ground as described above with reference to FIG. 1A.

The ASIC 200 also includes an H-bridge circuit control 210 that includes configuration register(s) 212 which include configuration indicators of the configurable H-bridge circuit 202(3) implementation. For example, a configuration register 214 maintains an indicator 216 (e.g., a zero data bit) that indicates configurable H-bridge circuit 202(3) is to be implemented as a motor drive circuit. Alternatively, configuration register 214 maintains indicator 216 (e.g., a one data bit) that indicates configurable H-bridge circuit 202(3) is to be implemented as discrete switches 208. Configuration register(s) 212 also include switch indicators 218(1) through 218(4) that each correspond to a discrete switch 208 of the configurable H-bridge circuit 202(3). The switch indicators 218 indicate a configuration of a discrete switch of the configurable H-bridge circuit 202(3) when the H-bridge circuit is implemented as discrete switches. For example, configuration register 220 includes switch indicator 218(1) that indicates a component switch configuration of the first high switch 208(1) of the configurable H-bridge circuit 202(3).

The configuration registers 212 are controlled by an integrated circuit serial bus (not shown) which connects the components of ASIC 200. The serial bus is used to communicate data bits (e.g., read and write data) to establish the register indicators, such as indicator 216, to enable and/or disable current limits and to set up gate drive voltages for the switches 208, and the like. The H-bridge circuit control 210 and the configuration registers 212 are programmable at a time of manufacture and can be programmed with firmware, for example, to configure and/or implement the configurable H-bridge circuit 202(3) as a motor drive circuit or as discrete switches.

When the configurable H-bridge circuit 202(3) is implemented as discrete switches 208 (as shown in this example), the first high switch 208(1) and the second high switch 208(2) are each connected to a voltage source 222 and have an output connection 224(1) and 224(2), respectively. A high side switch 208(1) can be implemented to turn a pen voltage on and off for an ink printhead in a printing device, for example. Further, the two high side switches 208(1) and 208(2) can be coupled in parallel to reduce the effective impedance such that a high side switch can pass a higher current.

Additionally, the first low switch 208(3) and the second low switch 208(4) are each connected to ground 226 and have an output connection 228(1) and 228(2), respectively. A low side switch 208(3) can be implemented as a general purpose input/output device, a programmable current sink, a fan drive, a solenoid drive, and the like.

Figure 3:
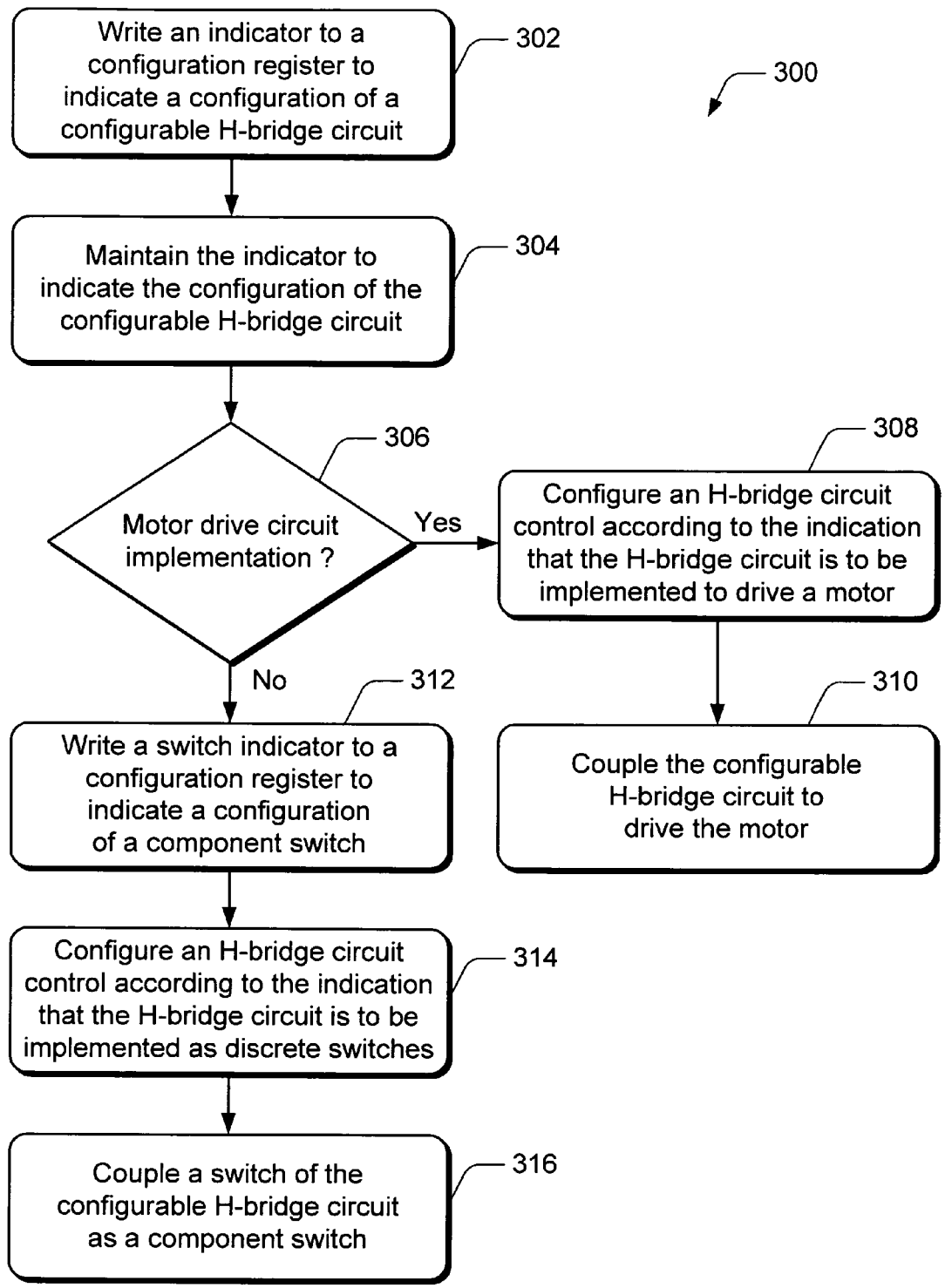
FIG. 3 is a flow diagram that illustrates a method for a configurable H-bridge circuit.

FIG. 3 illustrates a method 300 for a configurable H-bridge circuit that can be implemented as discrete switches or as a motor drive circuit. The order in which the method is described is not intended to be construed as a limitation, and any number of the described method blocks can be combined in any order to implement the method. Furthermore, the method can be implemented in any suitable hardware, software, firmware, or combination thereof. A method for a configurable H-bridge circuit may also be described in the general context of computer executable instructions. Generally, computer executable instructions include routines, programs, objects, components, data structures, and the like that perform particular function(s) or implement data type(s).

At block 302, an indicator is written to a configuration register to indicate a configuration of a configurable H-bridge circuit. For example, an indicator 216 (FIG. 2) indicates that the configurable H-bridge circuit 202(3) is to be implemented as a motor drive circuit (e.g., a zero data bit) or as discrete switches 208 (e.g., a one data bit). At block 304, the indicator is maintained to indicate the configuration of the configurable H-bridge circuit.

At block 306, a determination is made as to whether the configurable H-bridge circuit is to be implemented as a motor drive circuit (or as discrete switches). If the configurable H-bridge circuit is to be implemented as a motor drive circuit (i.e., "yes" from block 306), then an H-bridge circuit control is configured at block 308 according to the implementation indicator (as a motor drive). At block 310, the configurable H-bridge circuit is coupled to drive the motor. For example, configurable H-bridge circuit 100 is implemented as a motor drive circuit 104 to drive motor 116 (FIG. 1B).

If the configurable H-bridge circuit is to be implemented as discrete switches (i.e., "no" from block 306), then a switch indicator is written to a configuration register at block 312 to indicate a configuration of a component switch. For example, switch indicator 218(1) (FIG. 2) is written to configuration register 220 to indicate a configuration of discrete switch 208(1) of the configurable H-bridge circuit 202(3). At block 314, the H-bridge circuit control is configured according to the implementation indicator (as discrete switches). At block 316, a switch of the configurable H-bridge circuit is coupled as a component switch.

Figure 4:
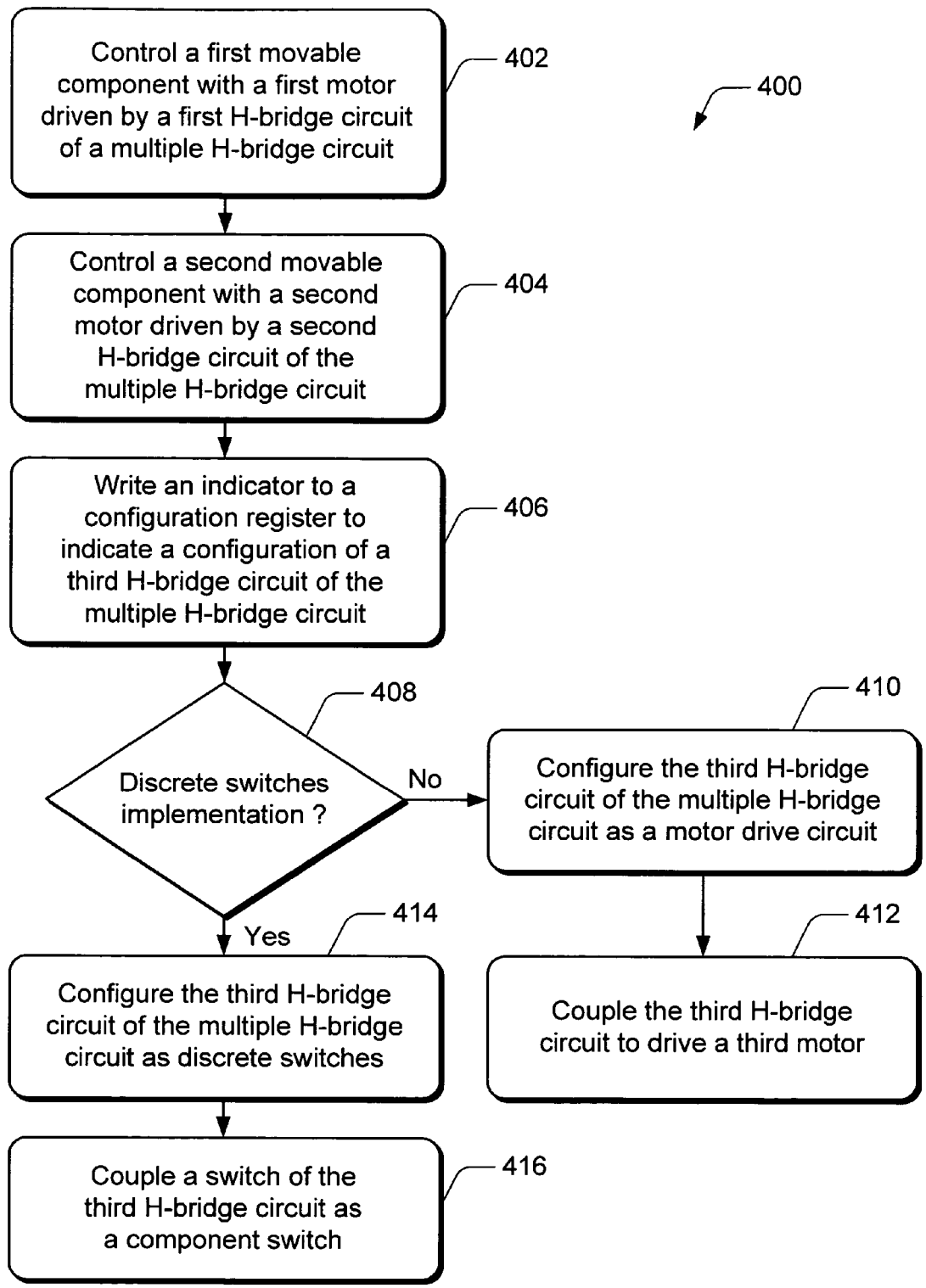
FIG. 4 is a flow diagram that illustrates a method for a configurable H-bridge circuit.

FIG. 4 illustrates a method 400 for a configurable H-bridge circuit that can be implemented as discrete switches or as a motor drive circuit. The order in which the method is described is not intended to be construed as a limitation, and any number of the described method blocks can be combined in any order to implement the method. Furthermore, the method can be implemented in any suitable hardware, software, firmware, or combination thereof. A method for a configurable H-bridge circuit may also be described in the general context of computer executable instructions. Generally, computer executable instructions include routines, programs, objects, components, data structures, and the like that perform particular function(s) or implement data type(s).

At block 402, a first movable component is controlled with a first motor driven by a first H-bridge circuit of a multiple H-bridge circuit. For example, a first motor 204 (FIG. 2) is driven by a first H-bridge circuit 202(1) of the ASIC 200. At block 404, a second movable component is controlled with a second motor driven by a second H-bridge circuit of the multiple H-bridge circuit. For example, a second motor 206 is driven by a second H-bridge circuit 202(2) of the ASIC 200.

At block 406, an indicator is written to a configuration register to indicate a configuration of a third H-bridge circuit of the multiple H-bridge circuit. For example, an indicator 216 (FIG. 2) indicates that the configurable H-bridge circuit 202(3) is to be implemented as a motor drive circuit (e.g., a zero data bit) or as discrete switches 208 (e.g., a one data bit).

At block 408, a determination is made as to whether the third H-bridge circuit is to be implemented as discrete switches (or as a motor drive circuit). If the third H-bridge circuit is not implemented as discrete switches (i.e., "no" from block 408), then the third H-bridge circuit is configured as a motor drive circuit at block 410 according to the indicator maintained in the configuration register. At block 412, the third H-bridge circuit of the multiple H-bridge circuit is coupled to drive a third motor.

If the third H-bridge circuit is to be implemented as discrete switches (i.e., "yes" from block 408), then the third H-bridge circuit is configured as discrete switches at block 414 according to the indicator maintained in the configuration register. At block 416, a switch of the third H-bridge circuit is coupled as a component switch.

Figure 5:
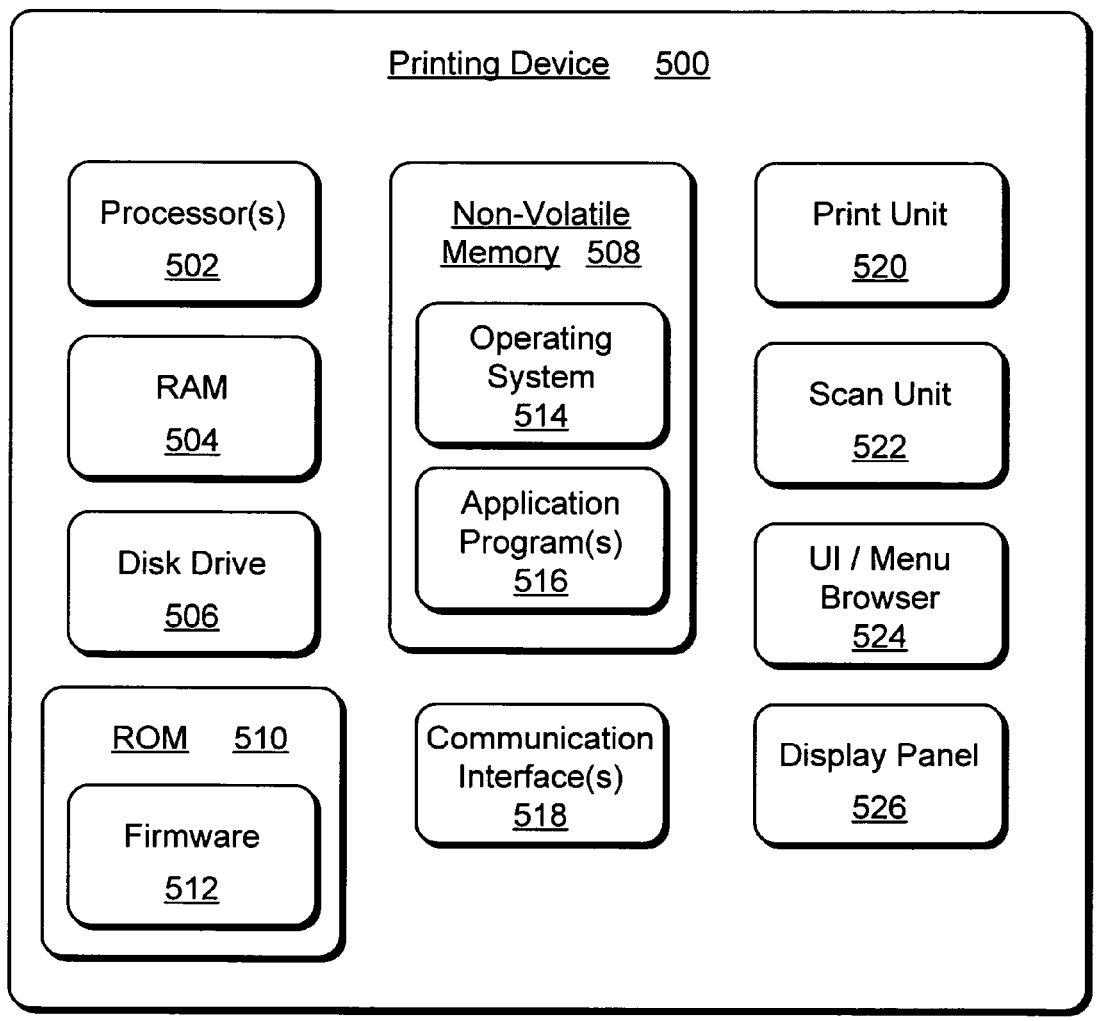
FIG. 5 illustrates various components of an exemplary printing device in which a configurable H-bridge circuit can be implemented.

FIG. 5 illustrates various components of an exemplary printing device 500 in which a configurable H-bridge circuit can be implemented as a motor drive circuit or as discrete switches. General reference is made herein to one or more printing devices, such as printing device 500. As used herein, "printing device" means any electronic device having data communications, data storage capabilities, and/or functions to render printed characters, text, graphics, and/or images on a print media. A printing device may be a printer, fax machine, copier, plotter, and the like. The term "printer" includes any type of printing device using a transferred imaging medium, such as ejected ink, to create an image on a print media. Examples of such a printer can include, but are not limited to, inkjet printers, electrophotographic printers, plotters, portable printing devices, as well as all-in-one, multi-function combination devices.

Printing device 500 includes one or more processors 502 (e.g., any of microprocessors, controllers, and the like) which process various instructions to control the operation of printing device 500 and to communicate with other electronic and computing devices.

Printing device 500 can be implemented with one or more memory components, examples of which include random access memory (RAM) 504, a disk drive 506, and non-volatile memory 508 (e.g., any one or more of a ROM 510, flash memory, EPROM, EEPROM, etc.). The one or more memory components store various information and/or data such as configuration information, print job information and data, graphical user interface information, fonts, templates, menu structure information, and any other types of information and data related to operational aspects of printing device 500.

Printing device 500 includes a firmware component 512 that is implemented as a permanent memory module stored on ROM 510, or with other components in printing device 500, such as a component of a processor 502. Firmware 512 is programmed and distributed with printing device 500 to coordinate operations of the hardware within printing device 500 and contains programming constructs used to perform such operations.

An operating system 514 and one or more application programs 516 can be stored in non-volatile memory 508 and executed on processor(s) 502 to provide a runtime environment. A runtime environment facilitates extensibility of printing device 500 by allowing various interfaces to be defined that, in turn, allow application programs 516 to interact with printing device 500.

Printing device 500 further includes one or more communication interfaces 518 which can be implemented as any one or more of a serial and/or parallel interface, a wireless interface, any type of network interface, and as any other type of communication interface. A wireless interface enables printing device 500 to receive control input commands and other information from an input device, such as from an infrared (IR), 802.11, Bluetooth, or similar RF input device. A network interface provides a connection between printing device 500 and a data communication network which allows other electronic and computing devices coupled to a common data communication network to send print jobs, menu data, and other information to printing device 500 via the network. Similarly, a serial and/or parallel interface provides a data communication path directly between printing device 500 and another electronic or computing device.

Printing device 500 also includes a print unit 520 that includes mechanisms arranged to selectively apply an imaging medium such as liquid ink, toner, and the like to a print media in accordance with print data corresponding to a print job. The print media can include any form of media used for printing such as paper, plastic, fabric, Mylar, transparencies, and the like, and different sizes and types such as 8½×11, A4, roll feed media, etc.

Printing device 500, when implemented as an all-in-one device for example, can also include a scan unit 522 that can be implemented as an optical scanner to produce machine-readable image data signals that are representative of a scanned image, such as a photograph or a page of printed text. The image data signals produced by scan unit 522 can be used to reproduce the scanned image on a display device or with a printing device.

Printing device 500 also includes a user interface and menu browser 524 and a display panel 526. The user interface and menu browser 524 allows a user of printing device 500 to navigate the device's menu structure. User interface 524 can be indicators or a series of buttons, switches, or other selectable controls that are manipulated by a user of the printing device. Display panel 526 is a graphical display that provides information regarding the status of printing device 500 and the current options available to a user through the menu structure.

Although shown separately, some of the components of printing device 500 can be implemented in an application specific integrated circuit (ASIC). Additionally, a system bus (not shown) typically connects the various components within printing device 500. A system bus can be implemented as one or more of any of several types of bus structures, including a memory bus or memory controller, a peripheral bus, an accelerated graphics port, or a local bus using any of a variety of bus architectures.

Although configurable H-bridge circuit(s) have been described in language specific to structural features and/or methods, it is to be understood that the subject of the appended claims is not necessarily limited to the specific features or methods described. Rather, the specific features and methods are disclosed as exemplary implementations of configurable H-bridge circuit(s).

The invention claimed is:

1. A configurable H-bridge circuit, comprising:
   two high switches connected to a voltage source;
   two low switches connected to ground;
   a register;
   wherein a first configuration of the configurable H-bridge circuit includes high switches and low switches connected together to independently drive a motor;
   a second configuration of the configurable H-bridge circuit in which the high switches and the low switches function as four discrete switches coupled to different components, the second configuration being different than the first configuration; and the register is configured to maintain an indication for each of the four discrete switches in addition to the configuration of the H-bridge circuit.

2. An application-specific integrated circuit (ASIC), comprising:

a configurable first H-bridge circuit that by alternative closing of switches includes a first configuration as a first motor drive circuit to drive a first motor, and includes a second configuration as discrete switches, each of the discrete switches configured to be coupled to supply electricity to independent electrically-powered components; and a configuration register configured to maintain an indicator of the configurable first H-bridge circuit configuration as at least one of the first motor drive circuit or as the discrete switches to supply electricity to independent electrically-powered components.

3. An ASIC as recited in claim 2, wherein the configuration register maintains the indicator that the configurable first H-bridge circuit is configured as the discrete switches to supply electricity to independent electrically-powered components.

4. An ASIC as recited in claim 2, wherein the configuration register is further configured to maintain a switch indicator that indicates a configuration of a discrete switch to supply electricity to independent electrically-powered components.

5. An ASIC as recited in claim 2, wherein:

the configurable first H-bridge circuit includes two high switches connected to a voltage source, and includes two low switches connected to ground; and in the first configuration as a motor drive circuit, one high switch and one low switch are configured to be connected together and coupled by closing switches to drive the motor.

6. An ASIC as recited in claim 2, further comprising at least a second H-bridge circuit configured to drive a second motor.

7. An ASIC as recited in claim 2, further comprising: a second H-bridge circuit configured as a second motor drive circuit;

a third H-bridge circuit implemented as a third motor drive circuit; and wherein the second H-bridge circuit is configured to drive the first motor and the third H-bridge circuit is configured to drive a second motor in an event that the configurable first H-bridge circuit is configured as the discrete switches.

8. A printing device, comprising:

a first motor configured for movable control of at least a first component in the printing device;

a second motor configured for movable control of at least a second component in the printing device;

a multiple H-bridge circuit including:

a first H-bridge circuit configured to independently drive the first motor;

a second H-bridge circuit configured to independently drive the second motor;

a configurable third H-bridge circuit that includes, by alternative closing of switches, a first configuration as a motor drive circuit to independently drive a third motor, and a second configuration as discrete switches that are each configured to be coupled to a different component as a component switch; and a register configured to indicate a status for each of the discrete switches in addition to the configuration of the configurable H-bridge circuit.

9. A printing device as recited in claim 8, further comprising a configuration register configured to maintain an indicator of the configurable third H-bridge circuit configuration as at least one of the motor drive circuit or the discrete switches.

10. A printing device as recited in claim 8, further comprising a configuration register configured to maintain an indicator that the configurable third H-bridge circuit is configured as the discrete switches.

11. A printing device as recited in claim 8, further comprising a configuration register configured to maintain an indicator that the configurable third H-bridge circuit is configured as the discrete switches, the configuration register further configured to maintain a switch indicator that indicates a configuration of a discrete switch.

12. A printing device as recited in claim 8, wherein the configurable third H-bridge circuit includes a high switch connected to a voltage source and includes a low switch connected to ground, and wherein the first configuration includes the high switch and the low switch connected together and coupled to drive the third motor.

13. A printing device as recited in claim 8, wherein the configurable third H-bridge circuit includes a high switch connected to a voltage source and includes a switch connected to ground, and wherein the second configuration includes at least one of the high switch and the low switch coupled as the component switch.

14. A printing device as recited in claim 8, further comprising an application-specific integrated circuit (ASIC) that includes the multiple H-bridge circuit, the ASIC further including a configuration register configured to maintain an indicator of the configurable third H-bridge circuit configuration.

15. A method, comprising:

writing an indicator to a configuration register to indicate an implementation by alternative closing of switches of a configurable H-bridge circuit as at least one of a motor drive circuit or as discrete switches;

coupling the configurable H-bridge circuit to drive a motor when the configurable H-bridge circuit is implemented as the motor drive circuit; and coupling a discrete switch of the configurable H-bridge circuit as a component switch when the configurable H-bridge circuit is implemented as the discrete switches to supply electricity to electrically-powered components.

16. A method as recited in claim 15, further comprising maintaining the indicator of the implementation of the configurable H-bridge circuit, wherein the indicator indicates at least one of a first configuration of the configurable H-bridge circuit as the motor drive circuit and a second configuration of the configurable H-bridge circuit as the discrete switches to supply electricity to independent electrically-powered components.

17. A method as recited in claim 15, further comprising writing a switch indicator to the configuration register to indicate a configuration of the component switch.

18. A method as recited in claim 15, wherein coupling the configurable H-bridge circuit to drive the motor includes:

connecting an output of a high switch of the configurable H-bridge circuit to an input of a low switch of the configurable H-bridge circuit, the high switch connected to a voltage source and the low switch connected to ground; and coupling the high switch and the low switch to drive the motor by closing the switches.

19. A method as recited in claim 15, further comprising configuring an H-bridge circuit control according to the indicator in the configuration register to couple the configurable H-bridge circuit to drive the motor in an event that the H-bridge circuit is implemented as the motor drive circuit.

20. A method as recited in claim 15, further comprising configuring an H-bridge circuit control according to the indicator in the configuration register to couple a switch of the configurable H-bridge circuit to a switched component in an event that the H-bridge circuit is implemented as the discrete switches to supply electricity to independent electrically-powered components.

21. A method, comprising:
controlling a first movable component in a printing device with a first motor independently driven by a first H-bridge circuit of a multiple H-bridge circuit;
controlling a second movable component in the printing device with a second motor independently driven by a second H-bridge circuit of the multiple H-bridge circuit;
configuring by alternative closing of switches a configurable third H-bridge circuit of the multiple H-bridge circuit in a first configuration to independently drive a third motor in an event that the third H-bridge circuit is to be implemented as a motor drive circuit;
configuring the third H-bridge circuit in a second configuration as discrete switches that are each configured to be coupled to a different component in an event that a switch of the third H-bridge circuit is to be implemented as a component switch; and
indicating a configuration for each switch and one of the first and second configurable third H-bridge circuit configurations.

22. A method as recited in claim 21, further comprising coupling the configurable third H-bridge circuit to drive the third motor in the first configuration.

23. A method as recited in claim 21, further comprising coupling the switch of the configurable third H-bridge circuit to a component in the second configuration.

24. A method as recited in claim 21, further comprising writing an indicator to a configuration register to indicate a configuration of the configurable third H-bridge circuit.

25. A method as recited in claim 21, further comprising:
writing an indicator to a configuration register to indicate a configuration of the configurable third H-bridge circuit; and coupling the configurable third H-bridge circuit to drive the third motor in the first configuration according to the indicator maintained in the configuration register.

26. A method as recited in claim 21, further comprising:
writing an indicator to a configuration register to indicate a configuration of the configurable third H-bridge circuit; and coupling the switch of the configurable third H-bridge circuit to a component in the second configuration according to the indicator maintained in the configuration register.

27. One or more computer-readable media comprising computer executable instructions for executing:
directing a printing device;
writing an indicator to a configuration register to indicate a configuration of a configurable H-bridge circuit as at least one of a motor drive circuit or as discrete switches by alternative closing of switches;
configuring the configurable H-bridge circuit in a first configuration to drive a motor in an event that the configurable H-bridge circuit is to be implemented as the motor drive circuit; and configuring the configurable H-bridge circuit in a second configuration as the discrete switches in an event that a switch of the configurable H-bridge circuit is to be implemented as a component switch to supply electricity to independent electrically-powered components.

28. One or more computer-readable media as recited in claim 27, further comprising computer executable instructions for executing:
coupling an output of a high switch of the configurable H-bridge circuit to an input of a low switch of the configurable H-bridge circuit, the high switch connected to a voltage source and the low switch connected to ground; and
coupling the high switch and the low switch to the motor in the first configuration that the configurable H-bridge circuit is implemented as the motor drive circuit.

29. A printing device, comprising:
means to independently drive a first motor to control a first movable component in a printing device;
means to independently drive a second motor to control a second movable component in the printing device;
means to configure by alternative closing of switches a configurable first H-bridge circuit in a first configuration as a motor drive circuit to independently drive a third motor;
means to configure by alternative closing of switches the configurable first H-bridge circuit in a second configuration as discrete switches to supply electricity to independent electrically-powered components; and
means to indicate a configuration for each switch and one of the first and second configurable first H-bridge circuit configurations.

30. A printing device as recited in claim 29, wherein:
the means to drive the first motor is a second H-bridge circuit of a multiple H-bridge circuit that includes the configurable first H-bridge circuit; and
the means to drive the second motor is a third H-bridge circuit of the multiple H-bridge circuit.

31. A printing device as recited in claim 29, further comprising means to couple the configurable H-bridge circuit to drive the third motor.

32. A printing device as recited in claim 29, further comprising means to couple a switch of the configurable H-bridge circuit as a component switch.

33. A multiple H-bridge circuit, comprising:
a first H-bridge circuit configured to drive a first motor;
a second H-bridge circuit configured to drive a second motor;
a register; and
a third H-bridge circuit including four switches, the four switches each having an individual configuration, and collectively having a programmable first configuration operable as a motor drive circuit and a programmable second configuration operable as four discrete switches,
wherein the register maintains an indication of the four switches' collective configuration separate from indications of each switch's individual configuration.

34. The multiple H-bridge circuit as recited in claim 33, wherein the register indicates the four switches' collective configuration with a single data bit.

35. The multiple H-bridge circuit as recited in claim 33, wherein the register maintains the indications of each switch's individual configuration when the four switches are programmed in the second configuration.

* * * * *